July 27, 1943.　　J. S. FORSTER ET AL　　2,325,048
GYROSCOPE
Filed Jan. 8, 1941
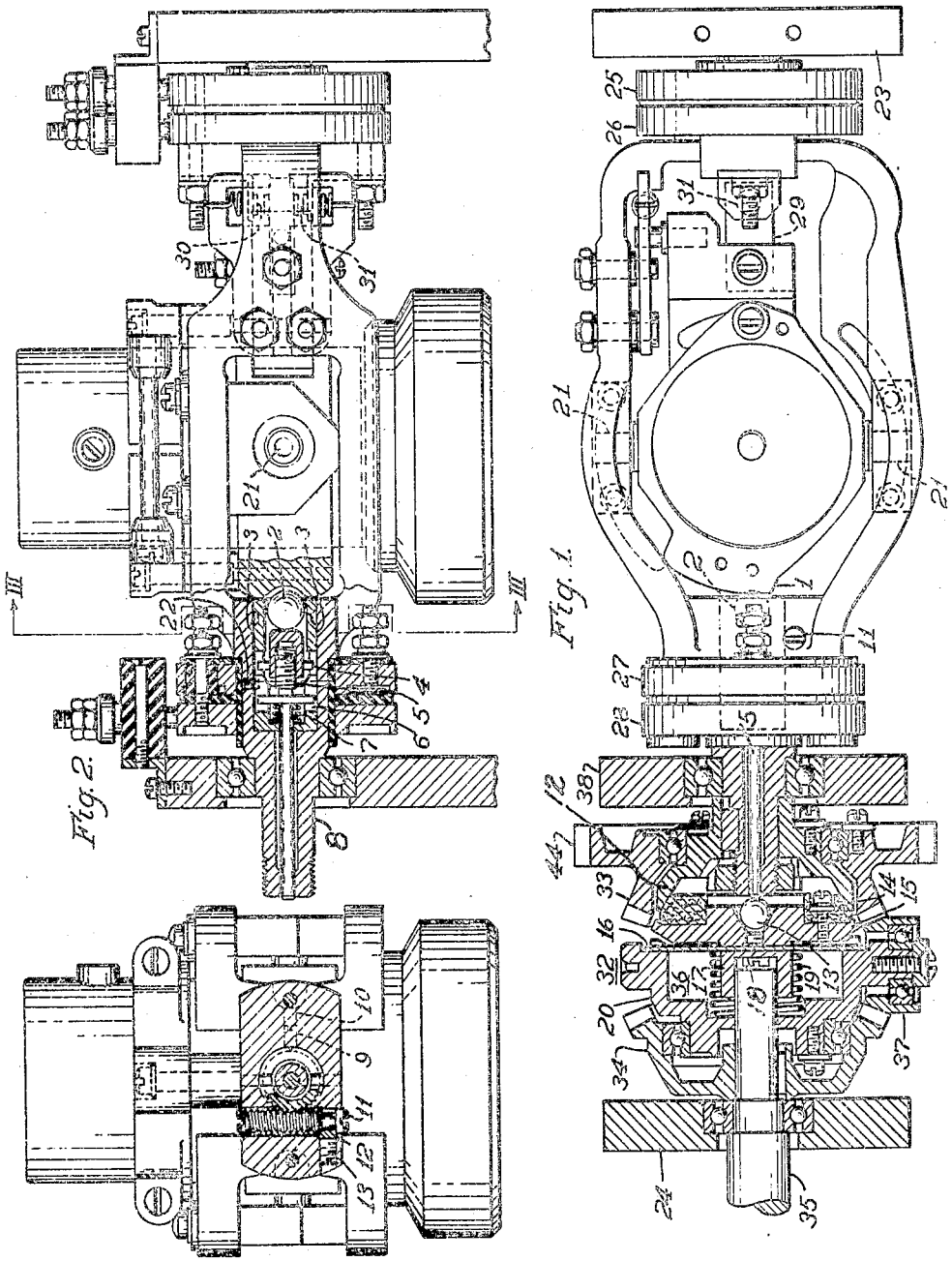
WITNESSES:
Edward Michaels
Wm. J. Russo
INVENTORS
John S. Forster &
Seymour W. Herwald.
BY
Paul E. Friedemann
ATTORNEY Patented July 27, 1943

2,325,048

UNITED STATES PATENT OFFICE 2,325,048

GYROSCOPE

John S. Forster, Pittsburgh, and Seymour W. Herwald, Wilkinsburg, Pa., assignors to Westinghouse Electric & Manufacturing Company, East Pittsburgh, Pa., a corporation of Pennsylvania Application January 8, 1941, Serial No. 373,680

9 Claims. (Cl. 74—5)

Our invention relates to gyroscopic apparatus, and more specifically to a means for protecting a gyroscope or a gyroscopic regulator from excessive torque loads caused by high precession speeds.

An object of our invention is to provide a simple, inexpensive and yet highly reliable means for protecting a gyroscope or a gyroscopic regulator from developing excessively high torques which might be destructive to the gyroscopic assembly.

A more specific object of our invention is to provide a clutch in a drive for a gyroscope assembly, which clutch is normally in engagement but which will become disengaged in response to a predetermined torque movement of the gyroscope resulting from the torque reaction of the gyroscope to precessional movement thereof.

Another object of our invention is to provide a gyroscopic assembly including a differential gear and including electrical contact members so that such assembly is particularly useful as a speed regulator for a reversible electric motor.

Other objects and advantages will become more apparent from a study of the following specification when considered in conjunction with the accompanying drawing, in which:

Figure 1 is a front view partly in cross-section of a gyroscope assembly embodying the principles of our invention;

Fig. 2 is a side view of a portion of the device shown in Fig. 1, which side view is partially in cross-section; and Fig. 3 is a sectional view taken along line III—III of Fig. 2.

Referring more particularly to Fig. 1, numerals 23, 24 and 38 denote portions of a frame structure for rotatably supporting a gyroscopic assembly. Such assembly includes a gyroscope having a torque axis, a spin axis and a precession axis, all of which axes are indicated on the drawing. These axes are all shown as being at right angles with respect to one another, although they may be only approximately at right angles, if so desired.

Collector rings 25, 26, 27 and 28 having suitable brushes associated therewith are used for the purpose of completing a circuit to the flexible and movable contact-carrying member 29 and to each of the two relatively stationary contact members 30 and 31. Such stationary contact members may each be connected to a different series field winding of a series motor so that when a circuit is closed by virtue of contacting relationship between member 29 and either of contact members 30 and 31, a predetermined direction of rotation of the motor is secured, which rotation may be used to correct for a deviation in speed in a regulating system. Such motor and circuit are not shown since they comprise a well known control system.

A differential gear 32 may have applied to each of its sun gears 33 and 34 rotative movements, the speeds of which are to be matched. For instance, spur gear 44 may be driven at one speed while drive shaft 35, which is keyed to sun gear 34, is driven at another speed. When gear 44 and shaft 35 (which are driven in opposite directions) are driven at the same speeds, the planetary gear assembly 36 will remain relatively stationary thereto. However, when these speeds are different, the planetary gear assembly, with its plurality of planetary gears such as 37, will revolve relative to sun gears 33 and 34. The above-described apparatus is indicative of merely one specific adaptation of our invention which is to be described more in detail hereinafter.

Our invention may be more clearly described by referring directly to the operation of the device, which is as follows. When excessive precession rotation of shaft 8 takes place, the gyroscope tilts about the trunnions 21 of its torque axis and causes the cam 1 to depress ball 2 and consequently adjustment cap 4, push rod 5, ball 13 and clutch 14. Rotation is imparted to the clutch by driving member 16 which fits into slots in part 20 and is fastened to the clutch by 17 and 18. Part 14 is the clutch facing and 12 the driven clutch member which is keyed to shaft 8. Ball 13 allows for the relative rotation of push rod 5 and clutch 14. The clutch is normally held in engagement by spring 19.

In order to make the clutch very sensitive, an accurate adjustment of the length of push rod 5 is provided. Sleeve 3 is held fixed axially but free in rotation by set screws 9 and lock screws 10. The rotation takes place when set screw 13 and collar 12 are released just far enough to allow rotation and yet no axial movement of adjustment screw 11.

The adjustment cap 4 is held in rotation with sleeve 3 by the ears and slots shown, whereas the push rod 5 is held in a similar manner in sleeve 6 which is fixed by set screw 22. Consequently, rotation of 11 causes 4 to rotate relative to 5 and a change of length takes place. Spring 7 takes care of the length difference.

By choosing the proper springs and gyroscopic inertia, the clutch may be made to operate at any speed of precession. After the clutch has operated, the gyroscope will continue to run at the clutch opening speed and no higher regardless of the speeds the driven member of the clutch goes to.

While our invention has been described as being applied to electrical switching means for a regulating system, it will be apparent that the torque movement of the gyroscope in either direction may be relied upon for other control functions which are responsive to the amount of precessional movement of the gyroscope.

We are, of course, aware that others, particularly after having had the benefit of the teachings of our invention, may devise other devices embodying our invention, and we, therefore, do not wish to be limited to the specific showings made in the drawing and the descriptive disclosure hereinbefore made, but wish to be limited only by the scope of the appended claims and such prior art that may be pertinent.

We claim as our invention:

1. In combination with a gyroscope having torque, spin and precession axes all substantially at right angles with respect to one another, means for rotatably supporting the entire gyroscope about its precession axis, drive means including a drive shaft and clutch coaxially disposed with respect to said precession axis for rotating the entire gyroscope, said clutch being normally in engagement and being disengageable in response to excessive speed of rotation by said drive means.

2. In combination with a gyroscope having torque, spin and precession axes all substantially at right angles with respect to one another, means for rotatably supporting the entire gyroscope about its precession axis, drive means including a drive shaft and clutch coaxially disposed with respect to said precession axis for rotating the entire gyroscope, said clutch being normally in engagement and being disengageable in response to predetermined excessive movement of the gyroscope about its torque axis as effected by torque reaction of the gyroscope to precessional movement.

3. In combination with a gyroscope having torque, spin and precession axes all substantially at right angles with respect to one another, means for rotatably supporting the entire gyroscope about its precession axis, drive means including a drive shaft and clutch coaxially disposed with respect to said precession axis for rotating the entire gyroscope, cam means movable in response to movement of the gyroscope about the torque axis for effecting disengagement of said clutch upon the attainment of a predetermined amount of torque reaction of the gyroscope of precessional rotation.

4. In combination with a gyroscope having torque, spin and precession axes all substantially at right angles with respect to one another, means for rotatably supporting the entire gyroscope about its precession axis, drive means including a drive shaft coaxially disposed with respect to said precession axis for rotating the entire gyroscope, a normally engaged clutch interposed in said drive means, a push rod coaxially disposed and longitudinally movable along said precession axis, a cam which is movable about said torque axis and which is operable to longitudinally move said push rod along the precession axis as the result of gyroscopic movement about the torque axis so as to effect disengagement of said clutch upon the attainment of a predetermined value of such movement.

5. Apparatus as set forth in claim 4 in which said push rod is adjustable in length along said precession axis in order to vary the sensitiveness of the clutch to torque reaction.

6. Apparatus as set forth in claim 4 together with ball means interposed between said cam and push rod for providing a frictionless joint.

7. Apparatus as set forth in claim 4 together with a ball interposed between said cam and push rod, said cam having a depression in which said ball is normally seated when torque movement is of a relatively small value.

8. In combination with a gyroscope having torque, spin and precession axes all substantially at right angles with respect to one another, means for rotatably supporting the entire gyroscope about its precession axis, drive means including a drive shaft coaxially disposed with respect to said precession axis for rotating the entire gyroscope, a normally engaged clutch interposed in said drive means, a push rod coaxially disposed and longitudinally movable along said precession axis, a cam which is movable about said torque axis and which is operable to longitudinally move said push rod along the precession axis as the result of gyroscopic movement about the torque axis so as to effect disengagement of said clutch upon the attainment of a predetermined value of such movement, an antifriction ball disposed between said cam means and one end of said push rod, another anti-friction ball disposed between the other end of the push rod and one of the clutch members.

9. In combination with a gyroscope having torque, spin and precession axes all substantially at right angles with respect to one another, means for rotatably supporting the entire gyroscope about its precession axis, drive means including a drive shaft and clutch coaxially disposed with respect to said precession axis for rotating the entire gyroscope, said clutch being normally in engagement and being disengageable in response to excessive speed of rotation by said drive means, a differential gear including two sun gears and a planetary gear assembly, said planetary gear assembly being rigidly secured to said drive shaft so as to rotate it in proportion to relative rotation of said sun gears.

JOHN S. FORSTER.
SEYMOUR W. HERWALD.